(12) United States Patent
Shoham

(10) Patent No.: US 7,506,198 B2
(45) Date of Patent: Mar. 17, 2009

(54) PROTECTION AND RECOVERY SYSTEM AND AUTOMATIC HARD DISK DRIVE (HDD) INSTANT RECOVERY

(75) Inventor: Dov Shoham, Hemed (IL)

(73) Assignee: Radix Israel, Ltd., Hemed (IL)

( * ) Notice: Subject to any disclaimer, the term of this patent is extended or adjusted under 35 U.S.C. 154(b) by 248 days.

(21) Appl. No.: 10/637,566

(22) Filed: Aug. 11, 2003

(65) Prior Publication Data

US 2005/0039076 A1 Feb. 17, 2005

(51) Int. Cl.
*G06F 11/00* (2006.01)
(52) U.S. Cl. ............................... 714/6; 714/5; 711/162
(58) Field of Classification Search .................... 714/6, 714/5, 20; 711/162
See application file for complete search history.

(56) References Cited

U.S. PATENT DOCUMENTS

| | | | |
|---|---|---|---|
| 5,333,285 A | | 7/1994 | Drerup |
| 5,448,045 A | * | 9/1995 | Clark .......................... 235/382 |
| 5,815,706 A | | 9/1998 | Stewart et al. |
| 5,966,727 A | * | 10/1999 | Nishino ....................... 711/127 |
| 6,016,553 A | | 1/2000 | Schneider et al. |
| 6,052,764 A | * | 4/2000 | Mogul ......................... 711/162 |
| 6,195,695 B1 | | 2/2001 | Cheston et al. |
| 6,205,527 B1 | * | 3/2001 | Goshey et al. ............... 711/162 |
| 6,275,933 B1 | | 8/2001 | Fine et al. |
| 6,532,535 B1 | * | 3/2003 | Maffezzoni et al. ............ 713/1 |
| 6,778,346 B2 | * | 8/2004 | Takayama et al. ............. 360/69 |
| 6,792,517 B1 | * | 9/2004 | Brunnett et al. ............... 711/162 |
| 6,820,214 B1 | * | 11/2004 | Cabrera et al. ................ 714/15 |
| 6,901,493 B1 | * | 5/2005 | Maffezzoni ................. 711/162 |
| 6,907,512 B2 | * | 6/2005 | Hill et al. ..................... 711/207 |
| 6,983,352 B2 | * | 1/2006 | Keohane et al. ............. 711/162 |
| 7,111,203 B2 | * | 9/2006 | Hu et al. ........................ 714/36 |
| 2002/0133747 A1 | | 9/2002 | Ravid |
| 2003/0028797 A1 | | 2/2003 | Long et al. |
| 2003/0229768 A1 | * | 12/2003 | Kawano et al. ............. 711/165 |

OTHER PUBLICATIONS

"peripheral component interconnect". www.wikipedia.com.*
Computeruser.com - www.computeruser.com/resources/dictionary/definition.html?lookup=6696.*
Wikipedia - en.wikipedia.org/wiki/USB_port.*

* cited by examiner

*Primary Examiner*—Yolanda L Wilson
(74) *Attorney, Agent, or Firm*—Dickstein Shapiro LLP

(57) ABSTRACT

A hard disk drive protection and recovery system permits recovery even if the operating system (e.g., MS-Windows, etc.) has crashed, failed, or been disabled/tampered with. If the recovery hardware is not found, the operating system cannot be loaded and the computer is disabled. The invention creates multiple recovery points and automatically selects a preferred point for recovery operations or sequentially applies restoration/back-up points in time order.

18 Claims, 6 Drawing Sheets

PROTECTION AND RECOVERY SYSTEM AND AUTOMATIC HARD DISK DRIVE (HDD) INSTANT RECOVERY

FIELD OF THE INVENTION

The present invention relates generally to computer hardware and software and more particularly to hardware-based recovery systems for hard disk drives (HDD) for personal computers.

BACKGROUND OF THE INVENTION

Significant time is lost by home users and small business alike in recovery operations due to user error, viruses, malfunctions or other failures. Back-up operations are onerous as well and most home and small business users do not have back-up procedures in place as does a large enterprise, which typically might perform a full system back-up weekly and incremental system back-ups daily. In this manner, should there be a system crash, an administrator or operator applies the appropriate back-ups after the fault/failure has been corrected. Thus, all but the most recent (since the last incremental back-up) data is restored.

Home users and small businesses often have no back-up procedures in place. It is often necessary to rebuild a HDD and then restore the contents. This is an onerous task and may take the better part of a work day leaving no time to get the real work of the business or home user done.

A number of proposals and products have been developed in this area. One such device is described by Gonen Ravid in U.S. Patent Application Publication No. 2002/0133747 A1 filed Mar. 13, 2001, hereinafter "Ravid". Ravid describes a hardware-based recovery system. The Ravid system employs both working and back-up hard disk drives and, in particular, the HDD protection and recovery apparatus (controller board) 10 of Ravid is plugged in between the computer and a HDD of the system. When there is a failure of the working HDD, the back-up HDD can be put into use via an A-B switch 14. When the back-up HDD is not selected, it remains "invisible" to the operating system. According to the Ravid application, the back-up HDD can be accessed selectively and/or incrementally.

Other proposals and products are on the market but both the software and hardware instant recovery solutions have drawbacks. In conventional hardware computer recovery systems, when a personal computer has a failure, the computer can only return to a single previous state (e.g., the master disk hard image) and require positive user intervention for the back-up process. Most software solutions depend on a functioning operating system for carrying out restoration tasks. Those solutions, therefore, work only after the successful loading of a functioning operating system, such as MS-Windows.

SUMMARY OF THE INVENTION

The present invention is directed towards a hardware-based recovery system. An internal universal serial bus (USB)-based or personal computer interface (PCI)-based card is plugged into a slot of a personal computer. The internal card functions to create multiple recovery points, where a recovery point is a snapshot of the state of the HDD (image) at time stamps/events.

According to one aspect of the invention, recovery is permitted even if the operating system (e.g., MS-Windows, MS-NT, MS-CE, UNIX, LINUX, MAC-OS, PALM-OS, etc.) has crashed, failed, or been disabled/tampered with. If the recovery hardware is not found (because the recovery hardware was inserted into an incorrect slot, or the recovery hardware is not the correct recovery hardware), the operating system cannot be loaded and the computer is disabled. Additionally, the recovery system can be arranged to work prior to the operating system being loaded and enables HDD restoration even if the operating system is completely disabled. If desired, the protection and recovery system creates multiple recovery points and automatically selects a preferred point for recovery operations.

According to another aspect of the invention, when a personal computer has a failure (e.g., an operation system crash, configuration changes, lost data, virus attack, etc.) a recovery system can be used to automatically return the computer to a preferred previous state. Thus, recovery for complex software related failures is accomplished without the need for commensurate technical skills. Should a failure occur, the computer could return to one of several recovery points. Additionally, the above features may be integrated with a personal electronic key feature, where a PC boot is only permitted to occur when the personal electronic key is inserted.

BRIEF DESCRIPTION OF THE DRAWINGS

The above and other features and advantages of the invention will be more readily understood from the following detailed description of the invention, which is provided in connection with the accompanying drawings.

DETAILED DESCRIPTION OF PREFERRED EMBODIMENTS

Figure 1:
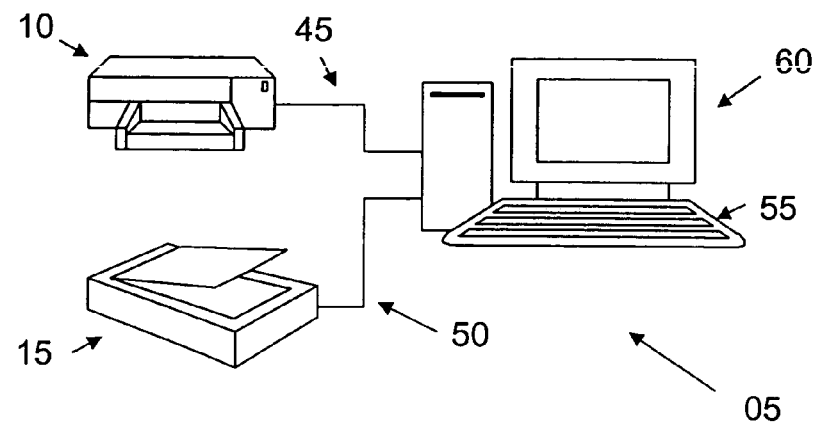
FIG. 1 shows a computer system, including a personal computer (PC), constructed in accordance with a preferred embodiment of the present invention.

Referring now to the drawings, where like reference numerals designate like elements, there is shown in FIG. 1 a PC system 05 constructed in accordance with a preferred embodiment of the present invention. The PC system 05 has a plurality of peripherals such as printer 10 and scanner 15. Printer 10 is connected to PC 05 via a connecting cable 45. Scanner 15 is also connected to PC 05 via a connecting cable 50. The PC 05 has a keyboard 55 and a monitor 60. PC 05 also has a HDD (not shown in FIG. 1) and any combination or all of the following peripheral devices: a modem, a mouse, multimedia devices including for example a digital camera, a zip drive (not shown) or other peripherals available for PC systems. PC 05 is shown having a tower 20 (see FIGS. 1 and 2), which houses components and cards/boards (e.g. mother board, graphics board, math accelerator board, etc.). PC 05 may be any brand or type of PC including SUN, MAC, eMAC, powerMAC. PC 05 is not limited as to use and may be used for any purpose including as small servers, network servers, etc.

Figure 2:
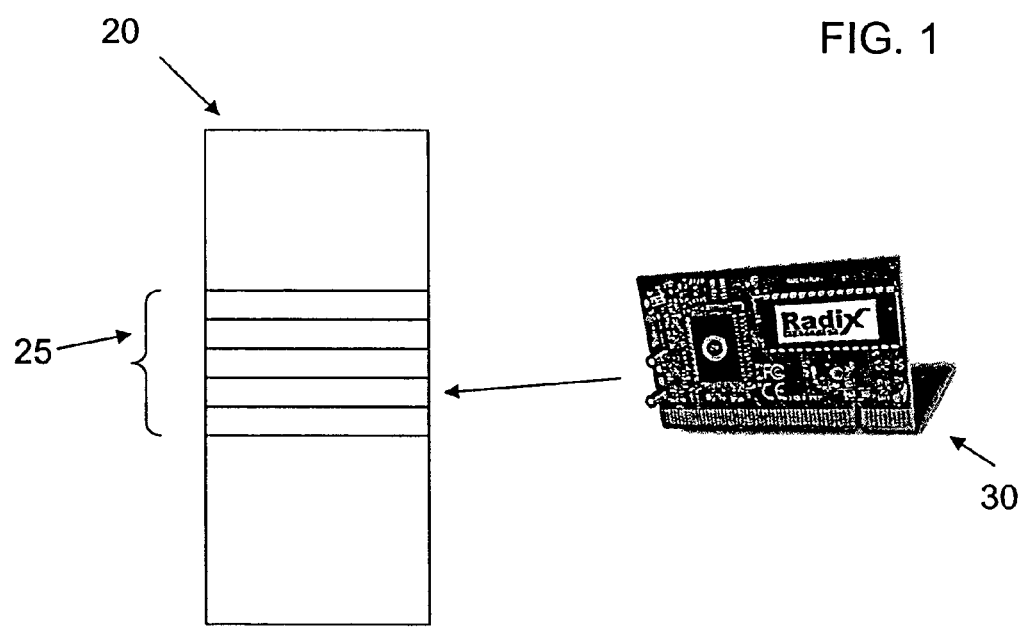
FIG. 2 is a schematic view of a portion of the system of FIG. 1.

As shown in FIG. 2, the tower 20 has slots into which are plugged cards or boards. The slots may be personal computer interface (PCI) slots or universal serial bus (USB) slots and the cards/boards, which are plugged into the slots, are correspondingly PCI-cards/boards or USB-cards/boards. In an alternative embodiment, the PC 05 may have a horizontal unit to house its components and cards/boards. The illustrated HDD protection and recovery card 30 is one such device that is plugged into one of the available (unused) slots 25 of tower 20 depending on the recovery system option (PCI or USB) selected. The protection and recovery system has two alternative embodiments when used with PCs 05—as a PCI-card/board for use in slots 25 or as a USB-card/board for use in slots 25. The underlying circuitry may be essentially the same even where the interface is different.

Figure 3:
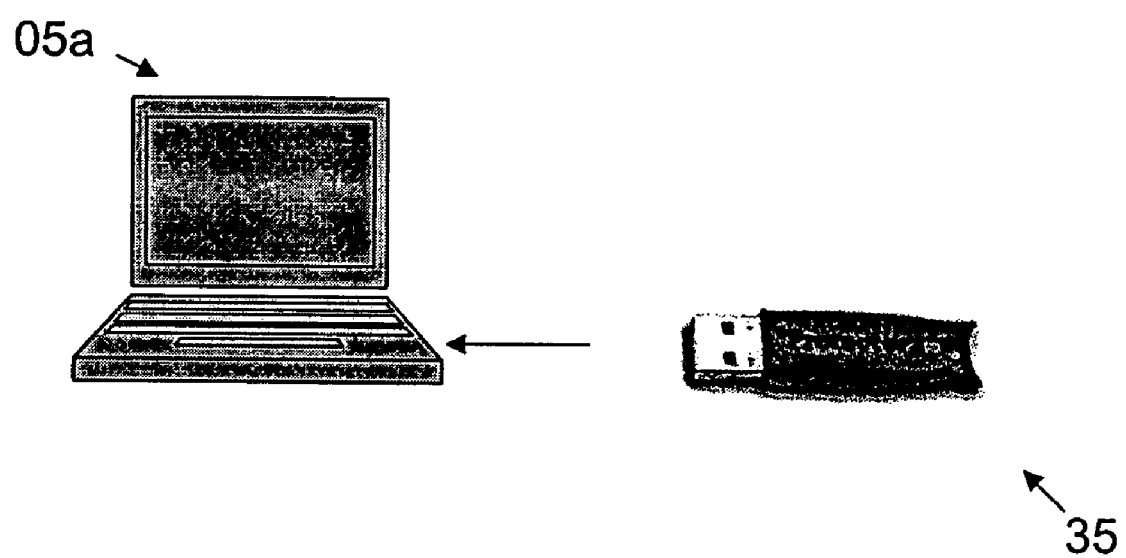
FIG. 3 shows another computer system, including a laptop or notebook computer, constructed in accordance with another preferred embodiment of the present invention.

FIG. 3 is an alternative preferred embodiment of the present invention used with a laptop or notebook computer. In this embodiment HDD protection and recovery device 35 replaces HDD protection and recovery card 30. The protection and recovery device 35 plugs into a USB port of the laptop or notebook computer. The HDD protection and recovery system of the present invention includes a HDD protection and recovery card/board or a HDD protection and recovery device and software installed and configured to operate the HDD recovery and protection card or device by creating at least one recovery point and permitting the recovery of the HDD from the at least one recovery point.

Figure 4:
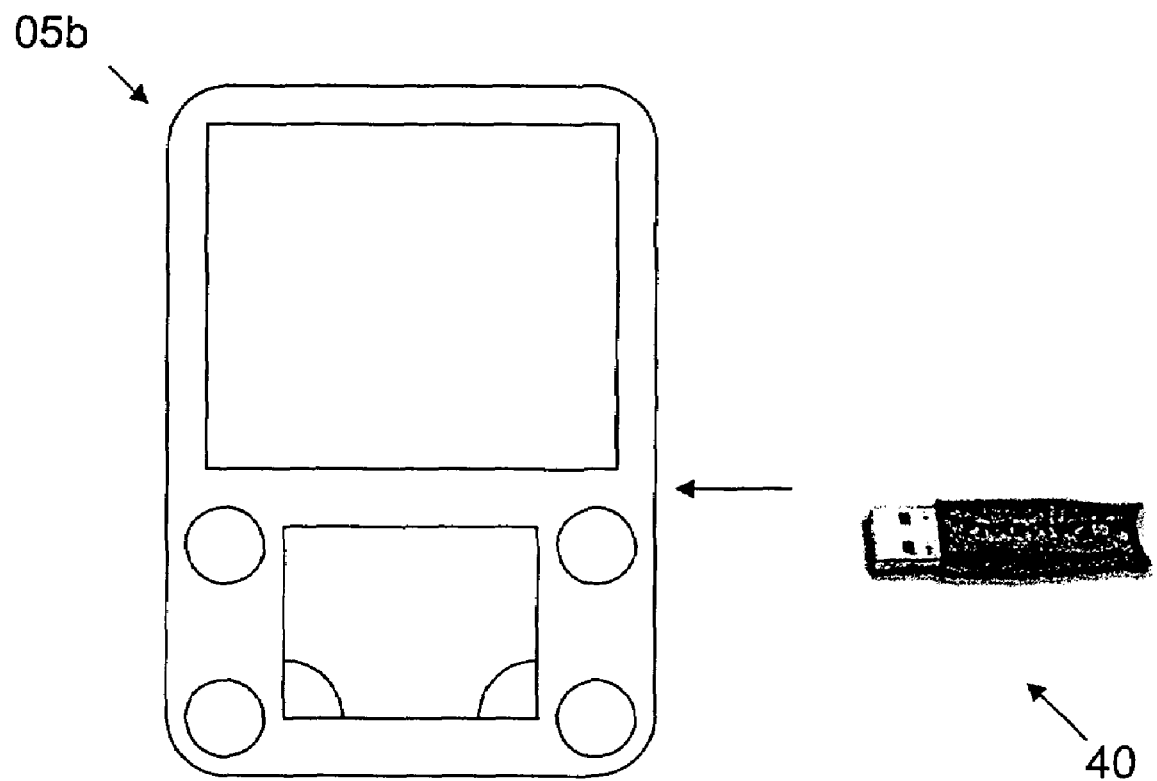
FIG. 4 shows another computing system, including a handheld computing device such as a Palm or personal digital assistant (PDA), constructed in accordance with another preferred embodiment of the present invention.

FIG. 4 is an embodiment of a micro-HDD protection and recovery device 40 used for micro-HDD protection and recovery for a handheld computing device such as a PDA or PALM 05b. The micro-HDD protection and recovery device is attached operationally to the handheld computing device via an expansion slot or expansion box having a USB port. A micro-hard disk drive is smaller in size but operates similarly to a hard disk drive and all references herein to a hard disk drive include a micro-hard disk drive, in particular, when used with a handheld computing device. The use of the term HDD below is intended to include micro-HDD, flash-HDD and any other HDDs for use in any kind/type of laptops, notebook computers, PCs and handheld computing devices. It is also noted that the protection and recovery device may be used in any embedded computing device such as are operable in cars, home appliances, such as TV sets, etc. The hardware interface for embedded computing devices may be different and the external appearance of the device may also be different but the underlying logic circuitry is the same.

Users of home and small business PCs produce data via emails, documents (spreadsheets, text documents and graphics), Internet downloads, etc. Users also frequently add new applications to their PC systems or upgrade applications already running on their PC systems. Using the HDD protection and recovery system, the user can configure the system with multiple recovery points and can thereby instantly restore their computers to any previously preset recovery point without any further or additional technical assistance.

The HDD protection and recovery system of the present invention uses both hardware and software. The hardware (logic circuitry) functions as a bootable device that enables access to data and software prior to operating system loading. The hardware is a card for PCs and a device for laptops, notebook computers and handheld computing devices. The logic circuitry will be referred to as apparatus hereinafter to include both a card and a device. The software is installed on the PC and executed each time the system is booted. Either or both of these illustrative embodiments or the combination may be implemented in hardware, in software, in firmware, as Application Specific Integrated Circuits (ASICs) or Field Programmable Gate Arrays (FPGAs) or any combination thereof.

Figure 5:
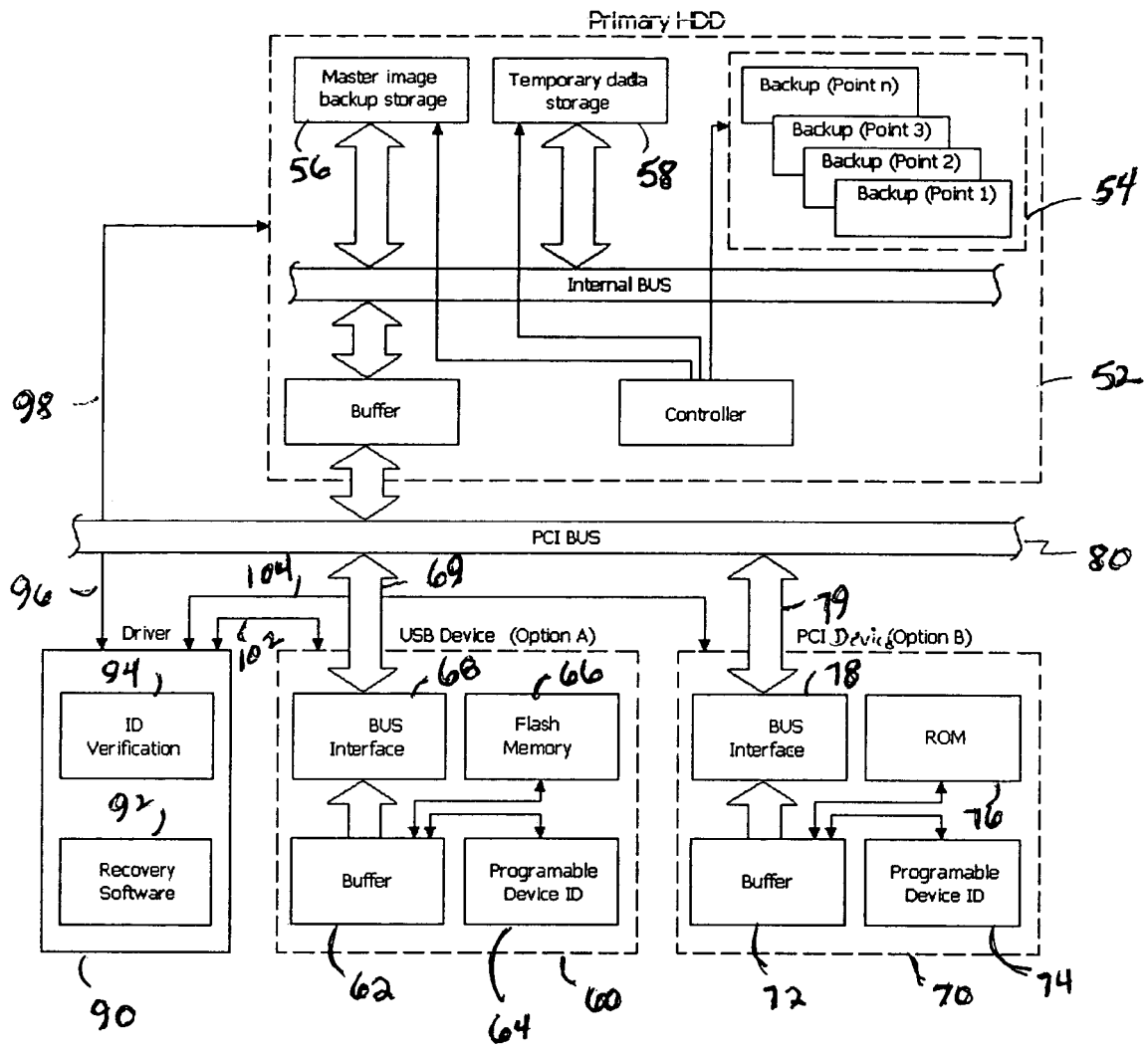
FIG. 5 is a schematic view of a portion of the system of FIG. 1, showing a hardware configuration.

FIG. 5 is a schematic view of a portion of the hardware. The hardware (logic circuitry) is physically on a card that is plugged into an available slot coupled to the PCI bus of a PC. For use with PCs there are two alternate embodiments. Both embodiments are cards that are inserted into free slots coupled to the PCI bus of a PC. The logic may be essentially the same for both embodiments. The interface may be different depending on whether the user selects a USB interface or a PCI interface. For use with a laptop, a notebook computer or handheld computing device such as a PDA or PALM, the protection and recovery apparatus is a device that plugs into a USB port.

The USB device module 60 of the HDD protection and recovery apparatus using a USB port is denominated Option A in FIG. 5 and the PCI device module 70 of the HDD protection and recovery apparatus using a PCI port is denominated Option B in FIG. 5. Since the logic circuitry is essentially the same, only Option A will be described. Option B operates similarly. The HDD protection and recovery apparatus includes driver module 90, and one of USB device module and PCI device module. The HDD protection and recovery apparatus also interfaces with the HDD in which are stored snapshots of the HDD at user-specified recovery points. The HDD is partitioned. The components of the HDD will not be described except for those affected by or used by the protection and recovery system.

According to option A, the HDD protection and recovery apparatus is plugged into an available USB slot. The USB device module 60 of the HDD protection and recovery apparatus interfaces bi-directionally with the PCI bus 80 of a PC via an interface 69. Information and control is exchanged between bus interface 68 and interface 69. Driver module 90 includes an ID verification module 94 and a recovery module 92. Driver module 90 interfaces directly with USB device module 60 via interface 102. That is, information and control signals do not use the PCI bus of the PC system 05. Buffer 62 forwards data to bus interface 68 in response to control signals from driver module 90 that have been forwarded to flash memory 66 and stored therein. The programmable device ID is stored in programmable device ID module 64 and is used in conjunction with the ID verification module of driver module 90.

The HDD stores a master image for back-up in Master Image Backup Storage 56. This master image is a baseline recovery image also called recovery "Point 0". This master image is created by the computer system manager. The manager might be a system administrator or the owner/operator of a home PC system 05, e.g., a parent. Data may also be stored temporarily in Temporary Data Storage 58, which is used for restoration with the software portion of the HDD protection and recovery system. Additional back-up/recovery/restoration points can be added and identified with a name and a short description. In addition to the name and description, the protection and recovery system stores the date and time of the snapshot. The additional back-up points are stored in one or more partitions of the HDD 54 and are used in the recovery process.

While the devices attached to a laptop or notebook computer or handheld computing device appear different, the logic contained therein is essentially the same and operates in accordance with the description of FIG. 5 above.

The PC system 05 may have at least 4 GB HDDs with at least 500 MB free disk space. Any anti-virus software and any virus protection in BIOS is disabled prior to installation of the HDD protection and recovery apparatus. After turning off the power to the PC and removing its cover, the protection and recovery apparatus is inserted into a free slot. Once the card is properly seated, then the cover is put back on the tower and the power is turned back on. Once the PC is running, execution of MS Windows in an appropriate version is initiated. In the case of laptop/notebook computers and handheld computing devices, installation of an HDD protection and recovery device 35, 40 is via a USB port and does not require the removal of the cover for installation.

Once MS Windows is verified to be properly running, then the HDD protection and recovery software is installed and configured. Configuration includes setting the manager's password and the user's name and password. The manager's password may be saved to a floppy disk. Further, configuration of the software portion of the HDD protection and recovery system includes the option to enable or disable features such as a user's name and password, restore and save.

During system configuration, it is also possible to select from a plurality of "Boot Options". That is, upon booting or rebooting the PC, the HDD may be restored, new back-up points may be added, work can be continued within the current partition or the partition saved. Specifically, selecting "Keep" during system configuration will not restore the system from a restoration point but rather will keep using the current partition from the last session. Selecting the "Add Point" option during system configuration will add a new restore/back-up point by taking a snapshot of the current status of the protected partition.

Prior to installing the hardware portion of the HDD protection and recovery system, the HDD should be configured to have a single primary boot partition. If a second primary partition exists it should be converted to an extended partition using an HDD partitioning utility. That is, the primary HDD partition is the protected partition. The number of restoration points is limited only by available HDD space. Selecting the "Restore" option during system configuration means that upon booting or rebooting the PC the protected partition is restored to a restore point last saved or optionally to the original "Point 0" created by the manager. The "Save" option may be selected by the system manager only and is password protected. Selecting the "Save" option means that the current status of the protected partition will be permanently saved. That is, the current status (snapshot) of the protected partition will be saved as the new "Point 0" and all prior existing restoration/back-up points will be erased.

During configuration it is also possible to add new restoration/back-up points. Back-up points may be desirable, for example, immediately prior to installation of new software or after a database update or at some other event. Back-up points may also be set daily, weekly, bi-weekly or monthly.

During configuration of the system, specific restoration/back-up points are selected. If only "Point 0" is available, the HDD will automatically be restored to "Point 0". If multiple restoration points have been defined, then any of the points may be selected. In order to prevent data loss in case of a power failure during Multi-Point Restoration, the HDD protection and recovery system will perform a sequential restoration "Point after Point". That is, the system will be restored to "Point 0", and then the next restoration point in time will be applied until all back-up points have been applied. Should a power failure occur during restoration, the restoration process will halt and all un-restored points will remain as they were.

During configuration, it is possible to select automatic saving and HDD restoration. One option for accomplishing automatic saving and HDD restoration is to display a menu upon each boot/reboot for the user to select the restoration point. Another option is to have the HDD protection and recovery system save a new back-up point at every boot with a fixed time interval (daily, weekly, monthly, etc.). The HDD protection and recovery system will add a new restoration point at the next boot but only if the system was working for a period of time longer than the specified fixed time interval. Another option is to configure the HDD to recover the protected partition to "Point 0" during every system boot. A further option is to select scheduled HDD restoration to "Point 0" at fixed time intervals. Yet another option is to keep the last status of a protected partition even if the PC system is rebooted.

Figure 6:
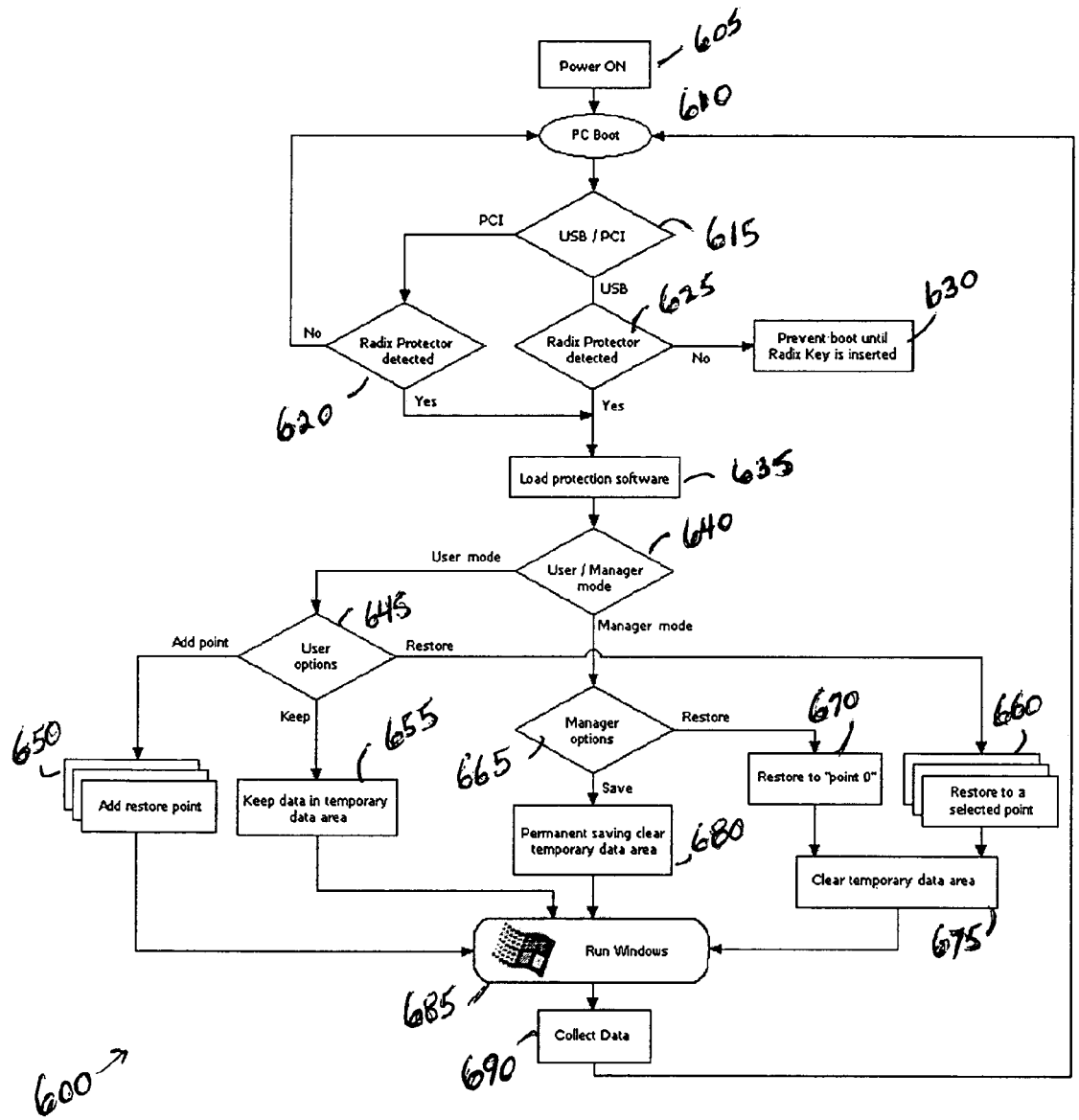
FIG. 6 is a flowchart illustrating the operation of a recovery system in accordance with the preferred embodiments of the present invention.

FIG. 6 is a flowchart of the operation of the recovery portion (software) 600 of the HDD protection and recovery system. The PC is powered on by a user at step 605 and the PC is booted at step 610. A check is made upon booting for the HDD protection and recovery apparatus at step 615. A subsequent check is made to determine if the HDD protection and recovery apparatus has a USB module at step 620 or a PCI module at step 625. If the PC has neither, or neither module is detected due to improper installation, then the system will be prevented from booting at step 630 until a personal electronic key is inserted. The driver module 90 of the HDD protection and recovery apparatus has the ID verification module 94, which is used for ID verification.

Once it is verified that the HDD protection and recovery apparatus is installed and that the ID is proper, then the recovery software stored in Recovery Software module 92 is loaded at step 635. A menu appears and the user is prompted to select user or manager mode at step 640. If user mode is selected then the user is prompted to select at step 645 from among the following: adding a point, keeping the current status or restoring the system. If the user selects adding a point, then a new restore/back-up point will be added at step 650. If the user selects keeping the current status, then the data is kept in the temporary data storage area 58 at step 655. If the user selects restoration, then the user is prompted to select a restoration point from a set of restoration points at step 660.

If the user selects manager mode at step 640, then the manager is given the option of restoring the HDD or saving the HDD at step 665. If the manager selects the restore option, then the HDD is restored to "Point 0" at step 670. Upon the completion of either step 660 or 670 the temporary data is cleared from the temporary data storage area at step 675. If the manager selects the save option, then the data stored in the temporary data storage area 58 is permanently saved as a new Point 0 and the temporary data storage area 58 is cleared at step 680. Upon the completion of any of steps 650, 655, 675 or 680, the Windows operating system is initiated at step 685. Data is collected in accordance with the configuration of the HDD protection and recovery system at step 690.

Figure 7:
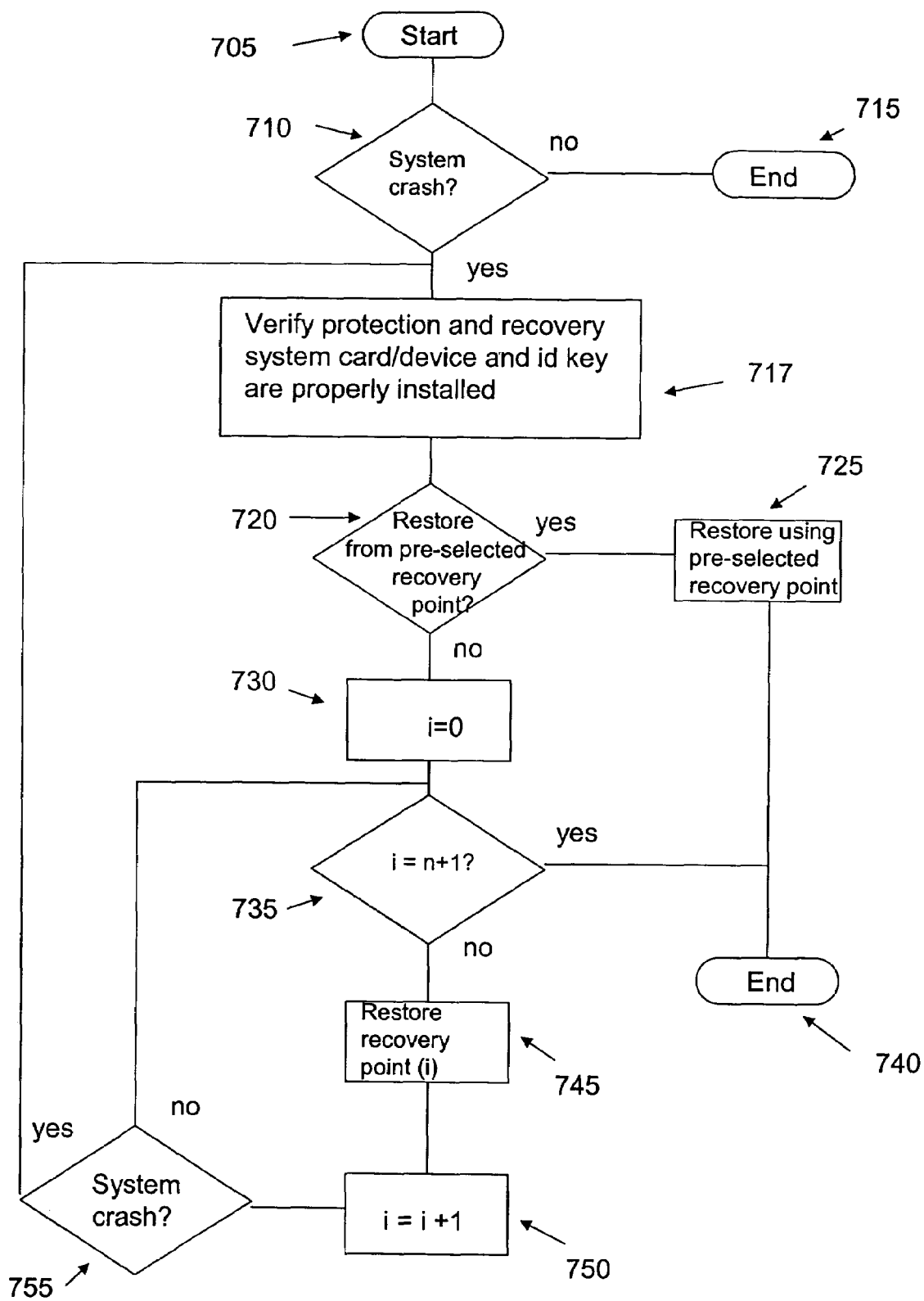
FIG. 7 is a flowchart illustrating recovery from a system crash in accordance with the present invention.

FIG. 7 is a flowchart illustrating HDD recovery from a system crash. The recovery portion of the HDD protection and recovery system starts at step 705. Step 710 is a query to determine if there has, in fact, been a HDD crash. If there has not been a HDD crash, then the recovery process ends at step 715.

Verification is performed to ensure that a HDD protection and recovery apparatus and an id key are properly installed and valid at step 717. Since there are two different recovery options that were pre-selected during configuration, step 720 determines if the pre-selected recovery process was recovery from a pre-selected recovery point. If this option was selected, then the HDD is restored from the pre-selected recovery point at step 725. The option then ends at step 740. If the option to use a pre-selected recovery point was not selected at system configuration, then HDD recovery is made by sequentially applying all available recovery points in time order.

A counter "i" is initialized to 0 at step 730. The counter is checked to make sure it has not been incremented to exceed the number of recovery points "n" by checking the counter against "n+1" at step 735. If all of the recovery points have been applied, then the recovery process ends at step 740. If all recovery points have not as yet been applied, then the next recovery point is applied at step 745. The counter is then incremented at step 750.

If there is a HDD crash while applying the recovery points sequentially, as determined at step 755, then the recovery process attempts to start over again at step 717. If there has been no HDD crash, then the recovery points continue to be applied until the recovery process is complete. In actuality, step 755 could be performed at anytime after step 720 or between any steps thereafter or viewed as an interrupt to restart the recovery process.

The HDD protection and recovery system of the present invention may be arranged for use on laptop computers, notebook computers and handheld computing devices. Handheld computing devices typically use the PALM OS operating system.

While the invention has been described and illustrated with reference to specific exemplary embodiments, it should be understood that many modifications and substitutions can be made without departing from the spirit and scope of the invention. Although the embodiments discussed above describe specific hardware, software, operating systems, the present invention is not so limited. Accordingly, the invention is not to be considered as limited by the foregoing description but is only limited by the scope of the claims.

What is claimed as new and desired to be protected by letters patent of the united states is:

1. A method of operating a computing device with an internal hard disk drive, said method comprising:
    booting said computing device;
    verifying the existence of a hard disk drive protection and recovery apparatus installed in said computing device prior to loading an operating system on said computing device;
    loading from said hard disk drive protection and recovery apparatus, a hard disk drive protection and recovery system that functions without loading an operating system for said computing device;
    determining a mode of operation for said protection and recovery system;
    selecting a backup or restore operation for said protection and recovery system to perform in the determined mode of operation; wherein said backup or restore operation copies data from one location to another on said internal hard disk drive;
    after performing said selected operation initiating the operating system for said computing device; and
    collecting incoming data and storing it in a temporary storage area on said internal hard disk drive, during normal use of said operating system, for preparing one or more restoration points on a partition of said internal hard disk drive.

2. The method according to claim 1, further comprising:
    preventing further booting operations upon failure of said verifying.

3. The method according to claim 1, wherein said mode of operation is a user mode or a manager mode.

4. The method according to claim 3, wherein in said user mode said selecting a backup or restore operation provides the operations of adding a restore point, restoring to a selected restore point, or keeping the changes in the temporary buffer.

5. The method according to claim 3, wherein in said manager mode said selecting a backup or restore operation provides the operations of storing the current situation as a baseline image or restoring the system to the stored baseline image or to any selected restore point.

6. The method according to claim 1, wherein said apparatus is connected to said computing device via a USB port.

7. The method according to claim 1, wherein said apparatus is connected to said computing device via a PCI slot.

8. The method according to claim 1, wherein said protection and recovery system restores the baseline image every time the computing device is rebooted.

9. The method according to claim 1, wherein said protection and recovery system adds a new restoration point every time the computing device is rebooted.

10. The method according to claim 1, wherein said selecting is performed by a user during booting of said computing device.

11. The method according to claim 1, wherein said selecting is performed by a user before rebooting of said computing device.

12. An apparatus for hard disk drive protection and recovery, said apparatus comprising:
    a device module communicating bi-directionally with said hard disk drive via a bus;
    a driver module in direct bi-directional communication with said device module, said driver module includes an identification (ID) verification module and a recovery software module, said recovery software module is adapted to store software loaded during a boot operation;
    wherein the hard disk drive includes a backup storage area for storing backup data and a temporary data storage area for storing incoming data, for use by said software module in a restoration process.

13. The apparatus according to claim 12, wherein said hard disk drive is partitioned into a primary hard disk drive.

14. The apparatus according to claim 13, wherein said hard disk drive has a master image back-up storage area for storing a baseline recovery image.

15. The apparatus according to claim 13, wherein said hard disk drive stores images for multiple recovery points.

16. The apparatus according to claim 15, wherein each said recovery point is associated with a name, a brief description and a time and a date.

17. The apparatus according to claim 15, wherein a number of said multiple recovery points is limited by available hard disk drive space.

18. The apparatus according to claim 14, wherein said device module further comprises: a buffer; a bus interface; a programmable device id, said programmable device id being in bi-directional communications with said buffer; and flash memory, said flash memory in bi-directional communications with said buffer, said buffer forwarding data to said bus interface, said bus interface in bi-directional communications with said hard disk drive via said bus.

* * * * *